United States Patent
Yang et al.

(10) Patent No.: US 10,075,004 B2
(45) Date of Patent: Sep. 11, 2018

(54) BATTERY JUMP-STARTING METHOD

(71) Applicant: HYUNDAI MOTOR COMPANY, Seoul (KR)

(72) Inventors: Hee Tae Yang, Seoul (KR); Yu Seok Kim, Seoul (KR); Jong Hu Yoon, Jeollanam-do (KR); Ho Joong Lee, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 125 days.

(21) Appl. No.: 15/240,063

(22) Filed: Aug. 18, 2016

(65) Prior Publication Data

US 2017/0149261 A1    May 25, 2017

(30) Foreign Application Priority Data

Nov. 25, 2015 (KR) .......................... 10-2015-0165615

(51) Int. Cl.
| | |
|---|---|
| *H02J 7/14* | (2006.01) |
| *H02J 7/00* | (2006.01) |
| *B60L 11/18* | (2006.01) |
| *B60S 5/00* | (2006.01) |

(Continued)

(52) U.S. Cl.
CPC ......... *H02J 7/0054* (2013.01); *B60L 11/1811* (2013.01); *B60S 5/00* (2013.01); *F02N 11/087* (2013.01); *F02N 11/0862* (2013.01); *H02J 1/00* (2013.01); *F02N 2011/0874* (2013.01); *F02N 2200/061* (2013.01); *H02J 2001/008* (2013.01)

(58) Field of Classification Search
USPC ........ 320/105, 109, 134, 126, 162, 166, 167
See application file for complete search history.

(56) References Cited

U.S. PATENT DOCUMENTS

| | | | | |
|---|---|---|---|---|
| 6,281,600 B1* | 8/2001 | Hough | .................... | F02N 11/14 |
| | | | | 307/10.6 |
| 8,688,299 B2* | 4/2014 | Saito | ........................ | B60K 6/48 |
| | | | | 180/65.21 |

(Continued)

FOREIGN PATENT DOCUMENTS

| | | |
|---|---|---|
| JP | 2003-18882 A | 1/2003 |
| JP | 2009-154847 A | 7/2009 |

(Continued)

OTHER PUBLICATIONS

Korean Office Action issued in Application No. 10-2015-0165615 dated Mar. 2, 2017.

(Continued)

*Primary Examiner* — Brian Ngo
(74) *Attorney, Agent, or Firm* — McDermott Will & Emery LLP

(57) ABSTRACT

The battery jump-starting method includes determining whether a vehicle is available for jump-start, turning off a switch controlling a relay when the vehicle is available for jump-start, and temporarily driving the vehicle in a state in which the switch is maintained in an OFF state when the vehicle is started. The battery jump-starting method enables a vehicle to temporarily drive when starting in a situation in which it is not possible to replace or charge a battery, upon determining whether the vehicle is available for jump-start.

7 Claims, 2 Drawing Sheets

(51) Int. Cl.
    *F02N 11/08*    (2006.01)
    *H02J 1/00*     (2006.01)

(56) References Cited

U.S. PATENT DOCUMENTS

| | | | |
|---|---|---|---|
| 2011/0288705 A1* | 11/2011 | Kawasaki | B60L 11/1803 |
| | | | 701/22 |
| 2012/0286720 A1 | 11/2012 | Fassnacht et al. | |
| 2015/0115972 A1 | 4/2015 | Park | |
| 2015/0251550 A1 | 9/2015 | Stegmueller et al. | |

FOREIGN PATENT DOCUMENTS

| | | |
|---|---|---|
| JP | 2011-244649 A | 12/2011 |
| JP | 2013-100040 A | 5/2013 |
| JP | 5479597 B2 | 4/2014 |
| JP | 2015-82502 A | 4/2015 |
| JP | 2015-173589 A | 10/2015 |
| KR | 20-0146274 Y1 | 6/1999 |
| KR | 10-2001-0111135 A | 12/2001 |
| KR | 10-2004-0108453 A | 12/2004 |
| KR | 10-2006-0014183 A | 2/2006 |
| KR | 10-2017-0011149 A | 2/2017 |

OTHER PUBLICATIONS

Korean Notice of Allowance issued in Application No. 10-2015-0165615 dated Sep. 18, 2017.

\* cited by examiner

BATTERY JUMP-STARTING METHOD

CROSS-REFERENCE TO RELATED APPLICATION

This application is based on and claims the benefit of priority to Korean Patent Application No. 10-2015-0165615, filed on Nov. 25, 2015, in the Korean Intellectual Property Office, the disclosure of which is incorporated herein in its entirety by reference.

TECHNICAL FIELD

The present disclosure relates to a battery jump-starting method, and more particularly, to a technique for enabling a vehicle to temporarily drive in a situation in which it is not possible to replace or charge a battery.

BACKGROUND

Conventional gasoline vehicles run mainly by driving a gasoline engine, and due to an increase in environmental pollution from the gasoline vehicles, electric vehicles in which an engine is driven by motor operation based on electricity have been developed.

Such gasoline vehicles emit a great deal of exhaust gases, thus increasing an environmental pollution. On the other hand, the electric vehicles may prevent environmental pollution, however since the electric vehicles run by batteries, they cannot drive for a long period of time.

As a solution to the problems of the gasoline vehicles and electric vehicles, hybrid electric vehicles having complex functions of both gasoline vehicles and electric vehicles have been introduced.

A hybrid electric vehicle is equipped with a general gasoline engine driving function and an electric motor driving function, and thus, the hybrid electric vehicle may be driven as a general gasoline vehicle or as an electric vehicle as necessary.

Since a hybrid electric vehicle includes components different from those of an existing gasoline vehicle or electric vehicle such as an engine, an alternator, a battery, a motor, and the like, various vehicle starting methods such as ON/OFF control of an engine alternator, and the like, according to battery power conditions are required when a vehicle is running.

When a hybrid electric vehicle is discharged, generally, a household power source is connected to a jump port provided in the hybrid electric vehicle and an engine starts using power processed through an AC-DC converter, a driving battery, a DC-DC converter, and a generator.

Since a lithium ion battery has been used in the hybrid electric vehicle, a jump-starting method using an external power source has been continuously used when the hybrid electric vehicle is over-discharged. However, in this case, a relay is frequently fused or a lithium ion battery is damaged in jump-starting.

SUMMARY

The present disclosure has been made to solve the above-mentioned problems occurring in the prior art while advantages achieved by the prior art are maintained intact.

An aspect of the present disclosure provides a battery jump-starting method for enabling a vehicle to temporarily drive when started in a situation in which it is not possible to replace or charge a battery, upon determining whether the vehicle is available for jump-start.

Any other technical subjects of the present disclosure not mentioned will be understood from the following descriptions and become apparent by exemplary embodiments in the present disclosure. Also, it may be easily understood that the advantages, features and aspects of the present disclosure may be realized by means and combinations demonstrated in claims.

According to an exemplary embodiment in the present disclosure, a battery jump-starting method includes: determining whether a vehicle is available for jump-start; turning off a switch controlling a relay when the vehicle is available for jump-start; and temporarily driving the vehicle in a state in which the switch is maintained in an OFF state when the vehicle is started.

The determining of whether the vehicle is available for jump-start may include: determining whether a potential difference between a front stage and a rear stage of the relay is equal to or greater than a set potential difference; and determining whether a potential at the rear stage of the relay is greater than 0.

A potential at the front stage of the relay may be the sum of battery voltages.

A potential at the rear stage of the relay may be a voltage supplied from a converter.

The switch may be constantly in an ON state, and in the determining of whether the vehicle is available for jump-start, the switch may be changed to an OFF state.

The temporarily driving of the vehicle may include: when the vehicle jump-starts, turning on a power relay assembly according to an output relay control signal; and when the power relay assembly is turned on, supplying power by a battery to a converter to turn on the converter.

The method may further include: after the temporarily driving of the vehicle, limiting speed of the vehicle and providing a warning sound or a warning sentence indicating that the vehicle is temporarily driving to a driver.

The method may further include: automatically charging a battery by turning on the relay when the vehicle is started.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
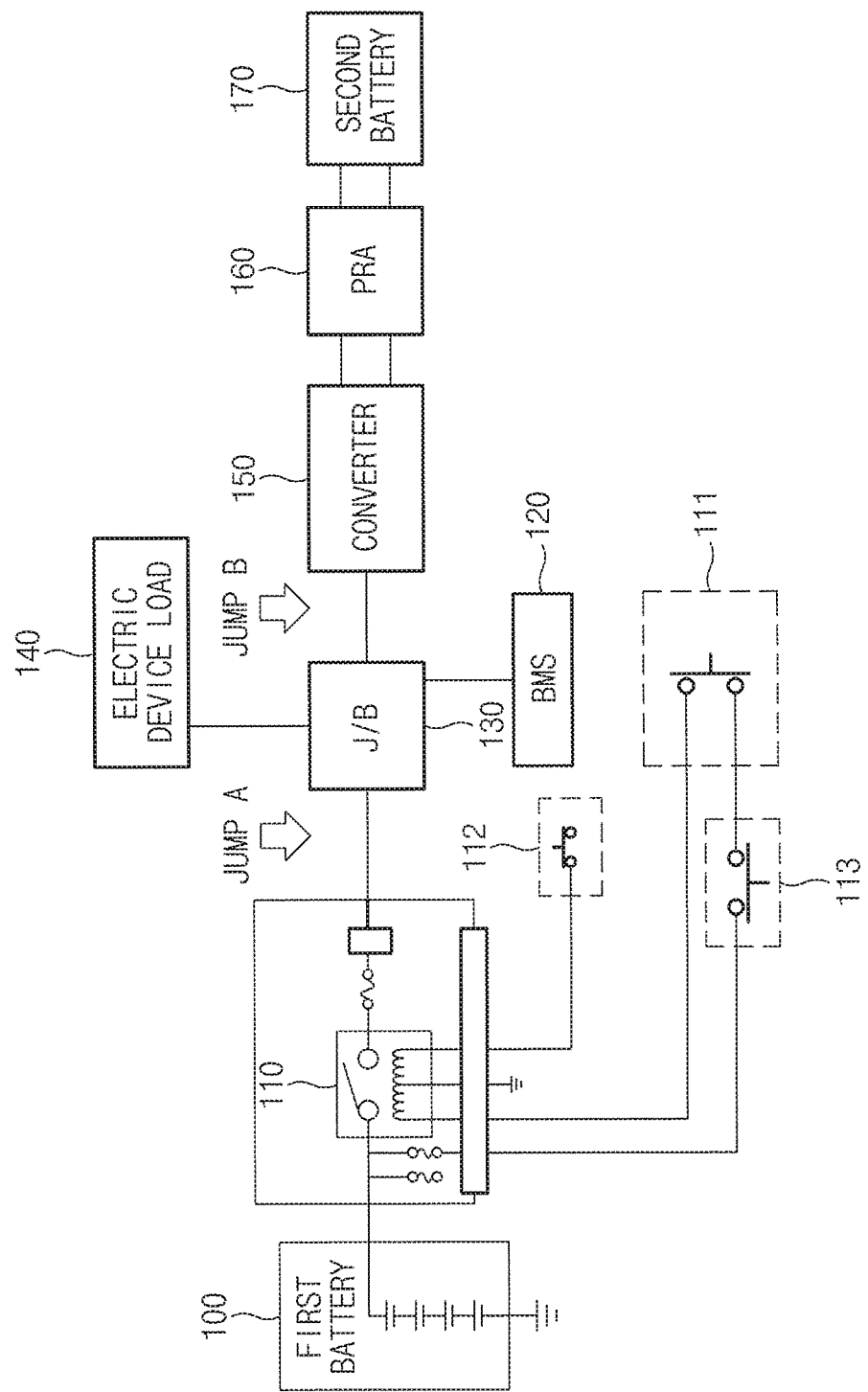
FIG. 1 is a view schematically illustrating a battery jump-starting method according to an exemplary embodiment in the present disclosure.

Advantages and features of the present disclosure, and implementation methods thereof will be described through exemplary embodiments described with reference to the accompanying drawings. The present disclosure may, however, be embodied in different forms and should not be construed as limited to the embodiments set forth herein. Rather, these embodiments are provided to describe the present disclosure so that a technical concept of the present disclosure may be easily practiced by those skilled in the art which the present disclosure pertains.

In the drawings, the exemplary embodiments in the present disclosure are not limited to a specific form and are exaggerated for clarity. The specific terms used in the present disclosure are merely used to describe the present disclosure, and are not intended to limit the scope of the present disclosure described in claims.

In the present disclosure, terms "and/or" include at least one of corresponding enumerated items. Also, terms "connected/coupled" include a direct connection with other component or an indirect connection through other component. In the present disclosure, the singular forms "a," "an" and "the" are intended to include the plural forms as well, unless the context clearly indicates otherwise. It will be further understood that the terms "comprises" and/or "comprising," when used in this specification, specify the presence or addition of stated components, steps, operations, or elements.

Hereinafter, exemplary embodiment in the present disclosure will be described in detail with reference to the accompanying drawings.

FIG. 1 is a view schematically illustrating a battery jump-starting method according to an exemplary embodiment in the present disclosure.

Referring to FIG. 1, in a situation in which a battery is to be jump-started, a battery jump-starting apparatus including a first battery 100, a relay 110, a first switch 111, a second switch 112, a third switch 113, a battery management system (BMS) 120, a junction box (J/B) 130, an electric device load 140, a converter (i.e., a low DC/DC converter (LDC)) 150, a power relay assembly (PRA) 160, and a second battery 170 according to an exemplary embodiment in the present disclosure operates.

The first battery 100, an auxiliary battery or a low-voltage battery, supplies power required for starting an engine of a vehicle and power to be consumed in the electric device load 140 (or an electrical component).

The relay 110, as an auxiliary battery relay, is a component for turning on or off current between the first battery 100 and the electric device load 140. The relay 110 may prevent the first battery 100 from being over-charged or over-discharged and prevent consumption current of the first battery 100 due to a dark current flowing in the electric device load 140.

The first switch 111 turns on the relay 110, the second switch 112 turns off the relay 110, and the third switch 113 turns on or off the relay 110. The third switch 113 is constantly in an ON state, but in a situation in which the battery is jump-started, the third switch 113 is changed to an OFF state.

The BMS 120 collects battery state information regarding a temperature, a voltage, a charge/discharge current, a state of charge (SOC) of a battery, and provides the collected battery state information to a controller within a vehicle such that the battery state information may be used in controlling the vehicle.

In particular, the BMS 120 checks a state of the battery and manages the battery to be maintained at a predetermined level or higher.

In addition, the BMS 120 prevents shortening of lifespan of the battery due to a degradation of durability of the battery, and provides battery SOC information to the vehicle controller that performs general controlling, to allow the vehicle to drive in consideration of a battery state, and determines whether the vehicle is available to be jump-started.

The J/B 130, which is a fuse box, senses current supplied to the electric device load 140 or performs transmission.

The low DC/DC converter (LDC) 150 converts a high voltage of the second battery 170 into a low voltage (for example, 14.3V to 13.5V) and supplies electricity appropriate for voltage used in the first battery 100 and the electric device load 140.

The PRA 160 includes two relays as main power source contacts, and a precharge relay and a precharge resistor installed in a circuit bypassing one of the two relays.

That is, a first relay (i.e., a positive (+) relay) is installed in a circuit between a positive (+) terminal of the second battery 170 and a DC link positive (+) terminal, second relay (i.e., a negative (−) relay) is installed in a circuit between a negative (−) terminal of the second battery 170 and a DC link negative (−) terminal, and the precharge relay and the precharge resistor are provided in a bypass circuit bypassing the first relay.

The relays of the PRA 160 are generally controlled to be turned on or off according to a relay control signal output from the BMS 120 or a motor control unit (MCU).

The second battery 170, a main battery or a high voltage battery, supplies electric energy require for assisting a motor when the vehicle is accelerated, and stores electric energy generated according to motor regeneration when the vehicle is decelerated or when there is excess horse power of the engine.

Figure 2:
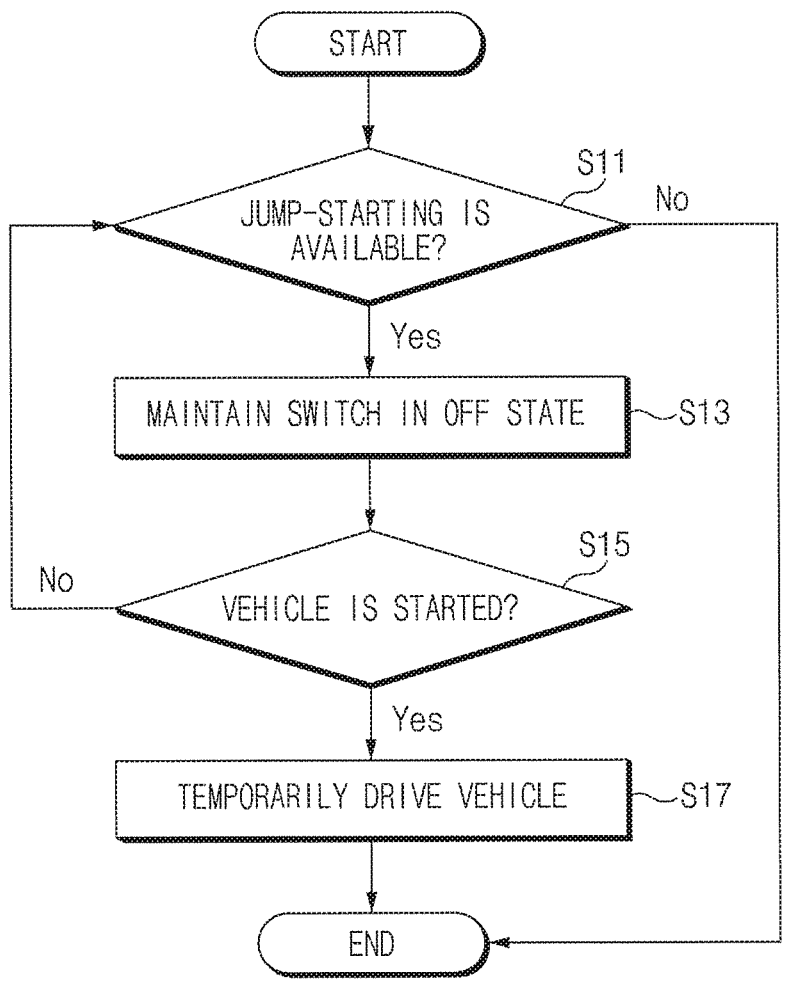
FIG. 2 is a flow chart illustrating a battery jump-starting method according to an exemplary embodiment in the present disclosure.

FIG. 2 is a flow chart illustrating a battery jump-starting method according to an exemplary embodiment in the present disclosure.

Referring to FIG. 2, a BMS determines whether a vehicle is available to be jump-started in operation S11.

In detail, the BMS may determine whether a relay is in an OFF state and determine whether a second switch is in an OFF state.

Here, in determining whether the vehicle is available to be jump-started, the BMS may determine whether a potential difference between a front stage and a rear stage of the relay has a value greater than a set potential difference, and when a potential of the rear stage of the relay has a value greater than 0V, the BMS may determine whether the vehicle is available to be jump-started.

For example, when there is no potential difference between the front stage and the rear stage of the relay (or when a potential difference between the front stage and the rear stage of the relay is smaller than the set potential difference), power supplied from a first battery and power supplied from a converter are uniform, and thus, the BMS determines that the relay is in an ON state.

However, when there is a potential difference between the front stage and the rear stage of the relay (or when a potential difference between the front stage and the rear stage of the relay is larger than the set potential difference), the BMS determines that the vehicle is available to be jump-started and relay is in an OFF state.

In addition, the BMS may determine whether the vehicle is available to be jump-started by determining whether the relay is in an OFF state, whether the second switch is in an OFF state, or whether the vehicle is in a start-off state, as stored.

After the BMS determines whether the vehicle is available to be jump-started, the BMS turns off the third switch such that the first switch may not be operated in operation S13.

Here, the reason for preventing the first switch from being operated is because, if the first switch is in an ON state even though the relay is in an OFF state and has a low voltage when the vehicle is jump-started, the relay or the battery may be damaged due to an over-current based on a difference between a potential at the front stage and a potential at the rear stage of the relay.

Thereafter, when a driver starts the vehicle, the vehicle may temporarily drive in operations S15 to S17.

Here, the BMS may display a sentence for supplying external power when the vehicle is started within the vehicle, and when the vehicle is started, may turn on the relay automatically charge the battery.

In another method for enabling the vehicle to temporarily drive, the converter may be controlled to be turned on constantly in a state in which the third switch is maintained in an OFF state.

In detail, when the vehicle is turned on through jump-starting, the PRA is turned on according to an output relay control signal.

When the PRA is turned on, a second battery supplies electric energy to the converter to turn it on.

Here, when the vehicle starts and temporarily drives, the controller within the vehicle may limit a velocity of the vehicle and a warning sound or a warning sentence indicating that the vehicle temporarily drives may be provided to or displayed for the driver.

As described above, the present disclosure relates to a technique for enabling a vehicle to temporarily drive when the vehicle is started in a situation in which it is not possible to replace or charge a battery.

In addition, the present disclosure allows the vehicle to be stably jump-started and appropriate specifications of the relay may be maintained.

Further, after service cost according to battery jump-starting may be reduced.

Hereinabove, although the present disclosure has been described with reference to exemplary embodiments and the accompanying drawings, the present disclosure not limited thereto, but may be variously modified and altered by those skilled in the art to which the present disclosure pertains without departing from the spirit and scope of the present disclosure claimed in the following claims.

What is claimed is:

1. A battery jump-starting method, comprising:
   determining whether a vehicle is available for jump-start;
   turning off a switch which controls a relay when the vehicle is available for jump-start; and
   temporarily driving the vehicle in a state in which the switch is maintained in an OFF state when the vehicle starts,
   wherein the determining of whether the vehicle is available for jump-start includes:
      determining whether a potential difference between a front stage and a rear stage of the relay is equal to or greater than a set potential difference; and
      determining whether a potential at the rear stage of the relay is greater than 0 (zero).

2. The battery jump-starting method according to claim 1, wherein a potential at the front stage of the relay is a sum of battery voltages.

3. The battery jump-starting method according to claim 1, wherein a potential at the rear stage of the relay is a voltage supplied from a converter.

4. The battery jump-starting method according to claim 1, wherein the switch is constantly in an ON state, and in the determining of whether the vehicle is available for jump-start, the switch is changed to an OFF state.

5. The battery jump-starting method according to claim 1, wherein the temporarily driving of the vehicle includes:
   when the vehicle jump-starts, turning on a power relay assembly according to an output relay control signal; and
   when the power relay assembly is turned on, supplying power by a battery to a converter to turn on the converter.

6. The battery jump-starting method according to claim 1, further comprising:
   after the temporarily driving of the vehicle,
   limiting a speed of the vehicle and providing a warning sound or a warning sentence indicating that the vehicle is temporarily driving to a driver.

7. The battery jump-starting method according to claim 1, further comprising automatically charging a battery by turning on the relay when the vehicle starts.

* * * * *